United States Patent [19]

Boateng

[11] Patent Number: 4,961,909
[45] Date of Patent: Oct. 9, 1990

[54] PROCESS FOR THE MANUFACTURE OF COPPER ARSENATE

[75] Inventor: Daniel A. D. Boateng, Montrose, Canada

[73] Assignee: Comino Ltd., Vancouver, Canada

[21] Appl. No.: 433,868

[22] Filed: Nov. 9, 1989

[51] Int. Cl.[5] .......................... C25B 1/14; C01G 28/02
[52] U.S. Cl. ...................................... 423/87; 204/98; 423/602
[58] Field of Search ................. 204/98; 423/87, 602

[56] References Cited

U.S. PATENT DOCUMENTS

| | | | |
|---|---|---|---|
| 2,198,045 | 4/1940 | Suchy et al. | 204/98 |
| 3,135,673 | 6/1964 | Tirrell et al. | 204/98 |
| 3,523,880 | 8/1970 | Parsi | 204/98 |
| 3,801,698 | 4/1974 | Lowrance et al. | 204/98 |
| 3,907,654 | 9/1975 | Radd et al. | 204/98 |
| 4,102,976 | 7/1978 | Hiemeleers et al. | 423/8.7 |
| 4,198,277 | 4/1980 | Kurtz et al. | 204/98 |
| 4,273,630 | 6/1981 | Specht | 204/98 |
| 4,444,633 | 4/1984 | Tolun et al. | 204/98 |
| 4,561,945 | 12/1985 | Coker et al. | 204/98 |
| 4,608,141 | 8/1986 | Chlanda et al. | 204/98 |
| 4,613,416 | 9/1986 | Kau et al. | 204/98 |

Primary Examiner—Wayne A. Langel
Attorney, Agent, or Firm—Arne I. Fors

[57] ABSTRACT

In a process for the manufacture of copper arsenate, an arsenic-containing material is subjected to an oxidative pressure leach with sodium hydroxide forming a leach solution containing sodium arsenate. Sodium arsenate solution is mixed with a solution of copper sulfate for the formation of a copper and arsenic-containing solution without the precipitation of copper arsenate. The copper and arsenic-containing solution is treated for the precipitation of copper arsenate with formation of sodium sulfate solution. At least one of the sodium arsenate-containing solution and the sodium sulfate solution is subjected to electrolysis with membranes for at least partial conversion to arsenic acid and sulfuric acid, respectively, and sodium hydroxide. The generated sodium hydroxide is used in the process, the sulfuric acid may be a by-product or is recycled for use in the preparation of copper sulfate solution, and the arsenic acid is used instead of sodium arsenate in the formation of the copper and arsenic-containing solution.

21 Claims, 3 Drawing Sheets

PROCESS FOR THE MANUFACTURE OF COPPER ARSENATE

This invention relates to copper arsenate and, more particularly, to improvements in a process for the manufacture of copper arsenate.

BACKGROUND OF THE INVENTION

Copper arsenate finds application in wood preservatives such as chromated copper arsenate. Chromated copper arsenate is generally made by dissolving the oxides of the constituent elements or by dissolving copper arsenate in chromic acid. Copper arsenate could be prepared by reacting solutions of a soluble arsenate with copper sulfate that are obtained from metallurgical processes that include leaching of arsenic-containing materials and copper-containing materials.

A number of processes for making copper arsenate have been disclosed such as in Canadian Patents 1 094 973 and 1 029 298, German Offen. DE 3 048 404 and U.S. Pat. No. 4 405 569.

The copper arsenate prepared from such processes has, generally, an impurity content that is too high to be acceptable under new specifications that require the total lead and iron content to be less than 0.1% by weight.

A method for the preparation of a low impurity-containing copper arsenate has been disclosed in co-pending U.S. Pat. Application No. 239 897 filed on Sept. 2, 1988 and assigned to the same assignee as the instant invention. According to this method, a solution of a soluble arsenate is added to copper sulfate solution, either or both solutions containing sludge-forming impurities, to form a copper and arsenic- containing solution without precipitating copper arsenate but precipitating the impurities at a controlled pH. After removal of precipitated impurities, the solution is neutralized to precipitate copper arsenate. Copper arsenate substantially free of impurities is recovered. In a preferred embodiment, the arsenate solution is formed by oxidative pressure leaching with sodium hydroxide of flue dusts, and copper sulfate is formed by acid oxidative pressure leaching of copper matte.

The method according to this co-pending application, wherein the copper and arsenic-containing solution is prepared from metallurgical starting materials, requires considerable amounts of sodium hydroxide and sulfuric acid to solubilize the arsenic as arsenate solution and the copper as copper sulfate solution. Another disadvantage is that the copper arsenate has an undesirably high water content when produced as a filter cake.

SUMMARY OF THE INVENTION

I have now found that major portions of the sodium hydroxide or the sodium hydroxide and the sulfuric acid requirements for the process can be provided by using electrolysis with membranes in the method according to the above-mentioned co-pending application which is hereby incorporated by reference.

In the broadest aspect of the process according to the invention, an arsenic-containing material is subjected to a leach with sodium hydroxide in the presence of oxygen for the formation of a leach solution containing sodium arsenate. Sodium arsenate solution is mixed with a solution of copper sulfate for the formation of a copper and arsenic-containing solution without the precipitation of copper arsenate. The copper and arsenic-containing solution is treated for the precipitation of copper arsenate with formation of sodium sulfate solution. Solution containing one of said sodium arsenate and said sodium sulfate is subjected to electrolysis with membranes for the formation of arsenic acid and sulfuric acid, respectively, and sodium hydroxide. The sodium hydroxide is recycled in the process, the sulfuric acid may be a by-product or may be used in the preparation of the copper sulfate solution, and the arsenic acid may be used instead of sodium arsenate in the formation of the copper and arsenic-containing solution. The sodium hydroxide and sulfuric acid formed by electroysis with membranes make up at least a portion of these reagents used in the process. The electrolysis with membranes is carried out such that at least a portion of the sodium arsenate or the sodium sulfate is converted into acid and hydroxide.

According to the first embodiment, arsenic-containing materials capable of yielding a sodium arsenate solution are subjected to an oxidative pressure leach with sodium hydroxide. After separation from the leach residue, sodium arsenate solution is subjected to electrolysis with membranes for the formation of arsenic acid solution and sodium hydroxide solution. The arsenic acid solution is mixed with a solution of copper sulfate at a controlled pH to precipitate impurities without precipitating copper arsenate. The copper and arsenic-containing solution is then treated for the precipitation of copper arsenate and the formation of a sodium sulfate solution. The copper arsenate substantially free of impurities is recovered. The sodium hydroxide formed in the electrolysis with membranes is used in the oxidative pressure leach and in the precipitation of copper arsenate. Optionally, the copper sulfate solutions may be prepared by the oxidative pressure leaching with sulfuric acid of a copper-containing material capable of yielding copper sulfate.

According to a second embodiment, after the oxidative pressure leach with sodium hydroxide according to the first embodiment, the sodium arsenate solution is (directly) mixed with a solution of copper sulfate, precipitated impurities are removed, copper arsenate is precipitated by the addition of sodium hydroxide and is recovered according to the first embodiment. The sodium sulfate solution formed in the copper arsenate precipitation is subjected to electrolysis with membranes for the formation of sulfuric acid and sodium hydroxide solution. The sodium hydroxide formed in electrolysis with membranes is used in the oxidative pressure leach and in the precipitation of copper arsenate, and the sulfuric acid may be recovered as a by-product or may be used in the optional preparation of the copper sulfate wherein a copper-containing material capable of yielding copper sulfate is subjected to an oxidative pressure leach with sulfuric acid.

According to a third embodiment, the process comprises the steps of the first and of the second embodiments and, in addition, the solution of copper sulfate is formed by subjecting a copper-containing material capable of yielding copper sulfate to an oxidative pressure leach with sulfuric acid for the formation of a copper sulfate solution and a leach residue. After separation of the leach residue, the solution of copper sulfate is mixed with the arsenic acid-containing solution formed in the electrolysis with membranes of the sodium arsenate solution. The sulfuric acid formed in the electrolysis with membranes of the sodium sulfate solution is passed to the oxidative pressure leach of the copper-containing material.

The electrolysis steps for the sodium arsenate and sulfate solutions are each carried out in an electrolysis unit containing a suitable arrangement of closely spaced suitable membranes and electrodes. A unit comprises at least one three- or at least one two-compartment cell with different configurations of electrodes and membranes. The two- or three-compartment cells may be arranged in multiples to form a stack.

The arrangements in units comprising 3-compartment cells include a bipolar or a monopolar electrode arrangement, and both anionic membranes and monovalent cation permselective membranes. The terminal electrodes in a monopolar unit are either two cathodes, two anodes or one cathode and one anode. For a bipolar arrangement, the terminal electrodes are one anode and one cathode. The electrodes and membranes are arranged such that a hydroxide compartment is defined between a cathode/cathodic surface and a cationic membrane, an acid compartment is defined between an anode/anodic surface and an anionic membrane, and a diluate compartment is defined between a cationic membrane and an anionic membrane. Arsenate or sulfate solution is fed into the diluate compartment. A direct electrical current is applied either between the terminal electrodes when bipolar electrodes are used or between all cathodes and anodes in the case of monopolar electrodes. Arsenate or sulfate ions pass through the anionic membranes into the acid compartment, where oxygen is being evolved. Sodium ions pass through the cationic membranes into the hydroxide compartment, where hydrogen is being evolved.

The arrangements in units comprising 2-compartment cells include a bipolar or a monopolar electrode arrangement, and only monovalent cation permselective membranes that are arranged between terminal electrodes as desribed above for the 3-compartment cell configuration. The electrodes and cationic membranes are appropriately arranged such that a hydroxide compartment is defined between a cathode/cathodic surface and a membrane and an acid compartment is defined between an anode/anodic surface and a membrane. Arsenate or sulfate solution is fed into the acid compartment. A direct electrical current is applied between terminal electrodes in the case of a bipolar electrode arrangement or between all cathodes and anodes in case of a monopolar electrode arrangement. Arsenate or sulfate ions remain in the acid compartment, while sodium ions pass through the cationic membranes into the hydroxide compartment.

In both 2- and 3-compartment configurations, oxygen is evolved at the anode/anodic surfaces which enables the formation of either arsenic acid with arsenate ions or sulfuric acid with sulfate ions in an acid compartment, and hydrogen is evolved at the cathode/cathodic surfaces which enables the formation of sodium hydroxide with sodium ions in a hydroxide compartment. Arsenic acid- or sulfuric acid-containing solution is withdrawn from the acid compartment, and sodium hydroxide-containing solution is withdrawn from the hydroxide compartment for use elsewhere in the process.

It is an object of the present invention to provide a method for making copper arsenate. It is another object to provide a method for making copper arsenate, including producing arsenic acid and sodium hydroxide from a sodium arsenate solution by electrolysis with membranes. It is a further object to provide a method for making copper arsenate, including producing sulfuric acid and sodium hydroxide from sodium sulfate solution by electrolysis with membranes. It is yet a further object to provide a method for treating sodium arsenate and sulfate solutions by electrolysis with membranes for the production of arsenic acid, sulfuric acid and sodium hydroxide for use in the process for making copper arsenate. It is yet another object to prepare substantially pure copper arsenate with a low water content from metallurgical raw materials. These and other objects of the present invention will become clear from the following detailed description.

BRIEF DESCRIPTION OF DRAWINGS

The invention will now be described with reference to the accompanying drawings wherein:

In FIGS. 1, 2 and 3, like steps are indicated with like numbers.

DETAILED DESCRIPTION

In the broadest aspect of the process according to the invention, an arsenic-containing material is subjected to a leach with sodium hydroxide in the presence of oxygen for the formation of a leach solution containing sodium arsenate. An arsenic solution, to be defined, is mixed with a solution of copper sulfate for the formation of a copper and arsenic-containing solution without the precipitation of copper arsenate. The copper and arsenic-containing solution is treated for the precipitation of copper arsenate with formation of sodium sulfate solution. Solution containing either said sodium arsenate or said sodium sulfate is subjected to electrolysis with membranes for the formation of arsenic acid-containing solution and sulfuric acid, respectively, and sodium hydroxide. The sodium hydroxide is recycled in the process, the sulfuric acid may be a by-product or may be used in the preparation of the copper sulfate solution, and the arsenic acid-containing solution is used instead of sodium arsenate solution in the formation of the copper and arsenic-containing solution. The sodium hydroxide and sulfuric acid formed by electrolysis with membranes make up at least a portion of these reagents used in the process. The electrolysis with membranes is carried out such that at least a portion of the sodium arsenate or the sodium sulfate is converted into acid and hydroxide. The above-mentioned arsenic solution is defined as either the sodium arsenate solution obtained from the leach or arsenic acid-containing solution obtained from the electrolysis.

Figure 1:
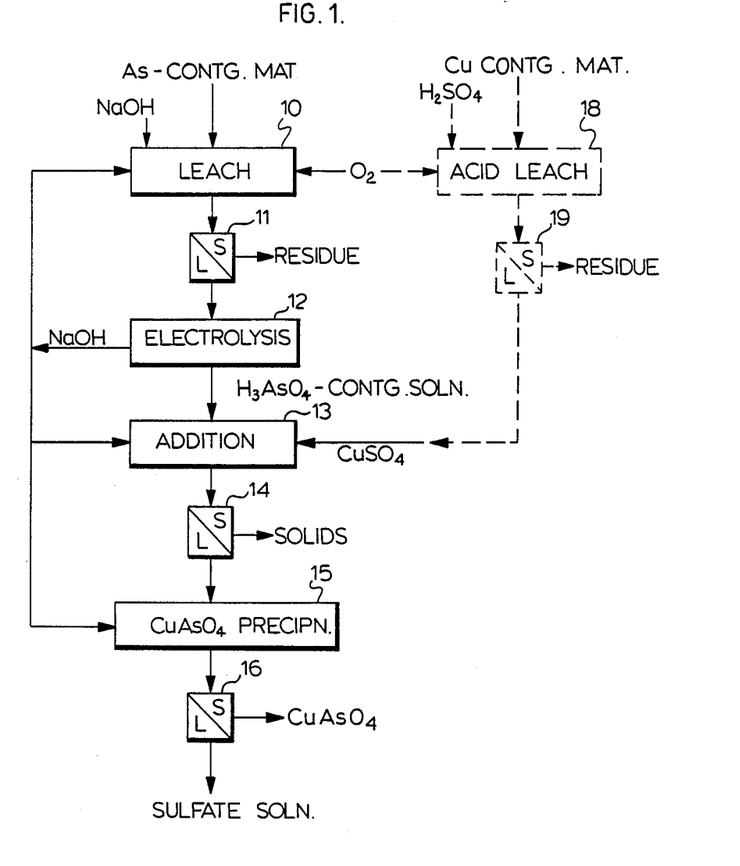
FIG. 1 is a schematic flowsheet of a first embodiment of the preparation of copper arsenate including an electrolysis of sodium arsenate solution.

With reference to FIG. 1, an arsenic-containing material is fed to a leach 10. The arsenic-containing material is chosen from materials capable of yielding a sodium arsenate solution in leach 10. These materials include ores, concentrates, speisses, slags, fumes and flue dusts and the like from which arsenic dissolves into sodium arsenate solution upon oxidative pressure leaching with sodium hydroxide with the formation of a sodium arsenate solution. In leach 10, the arsenic-containing material is leached with the addition of water, oxygen and an amount of sodium hydroxide. The hydroxide is preferably added in excess of the amount necessary to dissolve the arsenic as sodium arsenate. A portion of the sodium hydroxide used in the leach is provided from elsewhere in the process, as will be described.

The leach is carried out in an autoclave at a temperature in the range of about 120 to 180° C. and under pressure of oxygen with a total pressure of from about 0.7 to 2.0 MPa. The feed to the autoclave may be preheated and the autoclave contents may be cooled to maintain the desired temperature. Agitation is provided, and the leach is usually completed within two hours, usually within 30 to 60 minutes.

The autoclave contents are discharged and subjected to liquid-solids separation 11, which is carried out by conventional means. The solids residue may be washed and is removed from the process. The liquid fraction is the sodium arsenate solution that is fed to electrolysis 12.

The sodium arsenate solution is fed to electrolysis 12, which is carried out in a unit containing a configuration of electrodes and membranes. In electrolysis 12, at least a portion of the sodium arsenate is converted into arsenic acid and sodium hydroxide according to the overall equation:

$$Na_3AsO_4 + 3H_2O \rightarrow H_3AsO_4 + 3NaOH$$

Depending on the degree of conversion, the arsenic acid may be a mixture of arsenic acid and sodium arsenate and, thus, contain such compounds as mono- and di-sodium hydrogen arsenates. The arsenic acid may contain as low as 1 g/L sodium.

Electrolysis 12 is carried out in a unit that may contain one of a number of configurations of closely-spaced electrodes and membranes, preferably arranged in a stack. Such configurations of units comprise at least one 2compartment cell or at least one 3-compartment cell with a monopolar or a bipolar electrode arrangement in combinations with cationic membranes or cationic and anionic membranes.

In one configuration of a unit comprising a 3-compartment cell, one or more groups of a bipolar electrode with an anionic membrane adjacent its cathodic side and a cationic membrane adjacent its anodic side are arranged between a terminal cathode with an adjacent cationic membrane and a terminal anode with an adjacent anionic membrane. The arrangement is such that hydroxide compartments are defined between cathode/cathodic sides and a cationic membrane, acid compartments are defined between anode/anodic sides and an anionic membrane, and diluate compartments are defined between cationic and anionic membranes.

In a second configuration of a unit comprising a 3-compartment cell, a monopolar electrode arrangement replaces the bipolar arrangement of the first configuration. The unit comprises alternating anodes and cathodes each with an anodic membrane on either side of an anode and a cationic membrane on either side of a cathode, arranged between two terminal anodes or cathodes with an adjacent anionic membrane and a cationic membrane, respectively. Hydroxide compartments are defined between a cathode and a cationic membrane, acid compartments are defined between an anode and an anionic membrane, and diluate compartments are defined between anionic and cationic membranes.

In a first configuration of a unit comprising a 2-compartment cell, one or more bipolar electrodes each with an adjacent cationic membrane are arranged between a terminal cathode and a terminal anode with an adjacent cationic membrane. The arrangement is such that acid compartments are defined between the anode or the anodic side of a bipolar electrode and a cationic membrane, and hydroxide compartments are defined between the cathode or the cathodic side of a bipolar electrode and a cationic membrane.

In a second configuration of a unit comprising a 2-compartment cell, a monopolar electrode arrangement replaces the bipolar arrangement of the first configuration. The unit comprises alternating anodes and cathodes with a cationic membrane between each anode and cathode, such that acid compartments are defined between anode and a cationic membrane and hydroxide compartments are defined between a cathode and a cationic membrane.

In a configuration including bipolar electrodes, only the terminal electrodes are connected to a source of direct electrical current, while in a configuration including only monopolar electrodes, all anodes and all cathodes are connected to such a source.

In these configurations, as applicable, the anodes are made of an acid-resistant material such as, for example, lead; lead alloys of silver, antimony or calcium; or platinum, iridium or iridium/platinum-coated valve metals. The cathodes are made of an alkali-resistant material such as, for example, copper, lead, nickel, iron, steel, tin, silver, graphite, gold, platinum, or palladium; or platinum-plated titanium, zirconium or niobium; or alloys of lead or nickel.

A bipolar electrode is made from a suitable, electrical conductive material or composite that, when the direct current is applied causes formation of oxygen at the anodic side and hydrogen at the cathodic side. Suitable materials for bipolar electrodes comprise, for example, metals such as lead; alloys such as antimony-lead, silver-lead, or calcium-lead; and composites such as titanium coated with a noble metal or noble metal oxide, a metal with a cathodic side of, for example, nickel and an anodic side of platinum or platinum-plated niobium, tantalum, titanium, or zirconium, or a stainless steel cathodic side and a lead anodic side.

The cationic membranes are suitable monovalent cation permselective membranes such as, for example, those that have strongly acidic active groups and a membrane matrix of a styrene di-vinyl benzene copolymer on a polyvinyl chloride base, the active groups being sulfonic acid radicals (R-SO₃H). Perfluorocarbon membranes, having sulfonic or carboxylic acid active groups are especially suitable. Suitable membranes are treated Selemion ™ CMR, Selemion ™ CMT, Selemion ™ CSV, Selemion ™ CSR, and specially-treated Selemion ™ CMF membranes, manufactured by the Asahi Glass Company of Japan. Equivalent membranes manufactured by other companies may be used to yield the desired result. Suitable anionic membranes are those that are permselective for anions, and may include Selemion ™ AMV, Selemion ™ ASR, Selemion ™ AAV, and Selemion ™ AMT manufactured by the Asahi Glass Company. Similarly suitable membranes manufactured by other companies may be used to yield the desired result. The 2- and 3-compartment cell configurations and variants are described in more detail in co-pending United States application no. 433,467 assigned to the same assignee as the present invention, and which is hereby incorporated by reference.

Using the configurations of a unit comprising a 3-compartment cell, the sodium arsenate solution from liquid-solids separation 11 is fed into the diluate compartments of the electrolysis unit and is passed and recirculated through the diluate compartments. A portion of the circulating arsenate solution is removed from circulation as depleted diluate. Upon application of direct electrical current, oxygen is evolved at the anode/anodic side and hydrogen is evolved at the cathode/cathodic side. Sodium ions from the sodium arsenate solution pass through the cationic membranes and form sodium hydroxide in the hydroxide compartments. The sodium hydroxide solution is passed and recirculated through the hydroxide compartments. A portion of the circulating sodium hydroxide solution is withdrawn and passed to leach 10 or copper arsenate precipitation 15, to be described. Arsenate ions from the sodium arsenate solution pass through the anionic membranes and form arsenic acid-containing solution in the acid compartments. The arsenic acid-containing solution is passed and recirculated through the acid compartments, and a portion is passed to addition 13, to be described. Using the configuration of a unit comprising a 2-compartment cell, the sodium arsenate solution from liquid-solids separation 11 is fed into acid compartments of the electrolysis unit. Upon application of direct electrical current between anodes and cathodes, oxygen is evolved at the anodes and hydrogen is evolved at the cathodes. Sodium ions from the sodium arsenate in the recirculating arsenic acid-containing solution pass through the cationic membranes and form sodium hydroxide in the hydroxide compartments. The sodium hydroxide solution is passed and recirculated through the hydroxide compartments. A portion of the circulating solution is withdrawn and passed to leach 10 or copper arsenate precipitation 15, to be described. Arsenate ions from the sodium arsenate essentially remain in the acid compartments to form arsenic acid in an arsenic acid-containing solution. The arsenic acid-containing solution is passed and recirculated through the acid compartments, and a portion is passed to addition 13, to be described.

Water may be added to the acid and hydroxide compartments as necessary to give the desired acid and hydroxide concentration in the respective portions withdrawn from the electrolysis. Suitable arsenic acid concentrations for use in addition 13 may be 70–250 g/L. Suitable sodium hydroxide concentrations for recycle in various steps in the process, such as steps 10, 13 or 15, may be 40–200 g/L. When using a 3-compartment configuration for an electrolysis unit, diluate withdrawn from recirculation may be conveniently fed to the acid compartments to supply at least a portion of the amount of water required.

The electrolysis with membranes is carried out in a unit containing a suitable arrangement of closely-spaced suitable membranes and electrodes, as described, at a current applied between electrodes equivalent to a current density in the range of about 10 to 4,500 A/m$^2$, preferably in the range of about 200 to 4,000 A/m$^2$.

The temperature of solutions is in the range of from just above the freezing temperature of solution to as high as 60° C., preferably in the range of from ambient to about 50° C. The flows through the compartments should preferably be substantially balanced in order to avoid damage to the membranes. Damage is substantially avoided by maintaining flow rates such that the differential pressure across the membranes does not exceed about 150 kPa. The acid and hydroxide streams may be self-circulated, aided by the gas evolution. The feed rate of the feed solution is selected to give the equivalent sodium or arsenic feed to the electrolysis unit in the range of about 2 to 60 g/min.m$^2$ of membrane surface, the value selected being dependent on the value of the current density and the desired or optimium sodium arsenate conversion.

In addition 13, arsenic acid solution from electrolysis 12 is combined with copper sulfate solution under agitation to form a copper and arsenic-containing solution. The copper sulfate solution may be derived from copper sulfate crystals or from a copper-containing compound capable of yielding copper sulfate. The copper-containing compound can be chosen from oxides, ores, concentrates, speisses, slags, slimes, dusts, mattes, scrap and the like that contain copper.

Optionally, the copper sulfate solution used in addition 13 is obtained by subjecting a copper-containing material, such as an ore, concentrate, speiss, matte, slag or the like that contains copper, to an aqueous oxidative acid pressure leach 18 with sulfuric acid to produce a copper sulfate-containing leach solution, as indicated with broken lines. In acid leach 18, copper-containing material is slurried with sulfuric acid and the slurry is subjected to acid leach 18 in an autoclave and in the presence of an oxygen-bearing gas at elevated temperature and pressure. The leach 18 is carried out batch-wise or continuously at temperatures in the range of about 100° to 180° C. and under a partial pressure of oxygen in the range of about 0.7 to 2.0 MPa for the formation of a copper sulfate solution and a leach residue. The amount of sulfuric acid should be sufficient to yield a copper sulfate solution containing 100 to 200 g/L copper as copper sulfate. The reaction mixture is discharged by flashing, and is then subjected to liquid-solids separation 19 for removal of the leach residue from the copper sulfate solution which is passed to addition 13. Any excess copper sulfate solution may be treated for the recovery of copper sulfate.

Conditions in addition 13 are controlled such that impurities in the copper sulfate solution are precipitated but copper arsenate is not precipitated. Addition 13 is carried out at a temperature in the range of about 60° to 100° C. A ratio of arsenic to copper is maintained capable of yielding copper arsenate in a subsequent step, to be described, the ratio preferably being about unity. A pH in the range of about 1.7 to 2.2 is maintained in which range impurities precipitate and copper arsenate does not precipitate. Depending on the acidity, the pH is controlled in that range by adding an amount of sulfuric acid or sodium hydroxide as necessary. The preferred value of the pH is 1.8. Sodium hydroxide solution maybe supplied from electrolysis 12.

After the precipitation of impurities is complete, the copper and arsenic-containing solution containing precipitated impurities is passed to liquid-solids separation 14, wherein solids are separated from the copper and arsenic-containing solution by any one of a number of known methods. The solids are removed from the process, and the copper and arsenic-containing solution is passed to copper arsenate precipitation 15. In precipitation 15, copper arsenate is precipitated by adding sodium hydroxide solution to the copper and arsenic-containing solution. Sodium hydroxide solution may be supplied from electrolysis 12. The pH in precipitation 15 is controlled at a value in the range of about 3.2 to 4.2. Precipitation 15 is carried out at a temperature in the range of about 60 to 90° C. Precipitation 15 is preferably carried out by adding a solution containing in the range of about 20 to 50 g/L sodium hydroxide to a value of the pH of about 3.5.

After copper arsenate precipitation is complete, the material from precipitation 15 is subjected to liquid-solids separation 16, wherein a sodium sulfate solution is separated from the copper arsenate. After washing the solids, copper arsenate substantially free of impurities that may form a sludge in the preparation, storage or application of wood preservatives, is recovered as product. The copper arsenate contains not more than about 0.1% total of iron and lead by weight.

The embodiment described with reference to FIG. 1 has a number of important advantages. The electrolysis with membranes of the sodium arsenate solution yields an arsenic acid-containing solution that contains a reduced amount of certain impurities. Also removed is, of course, at least a portion of the sodium constituent of the sodium arsenate, and this results in the formation of copper arsenate that has a much lower water content than if all the sodium arsenate (without electrolysis with membranes) were used to prepare the copper arsenate. Another advantage is the recovery of sodium hydroxide solution that can be recycled in the process, thereby reducing costs.

Figure 2:
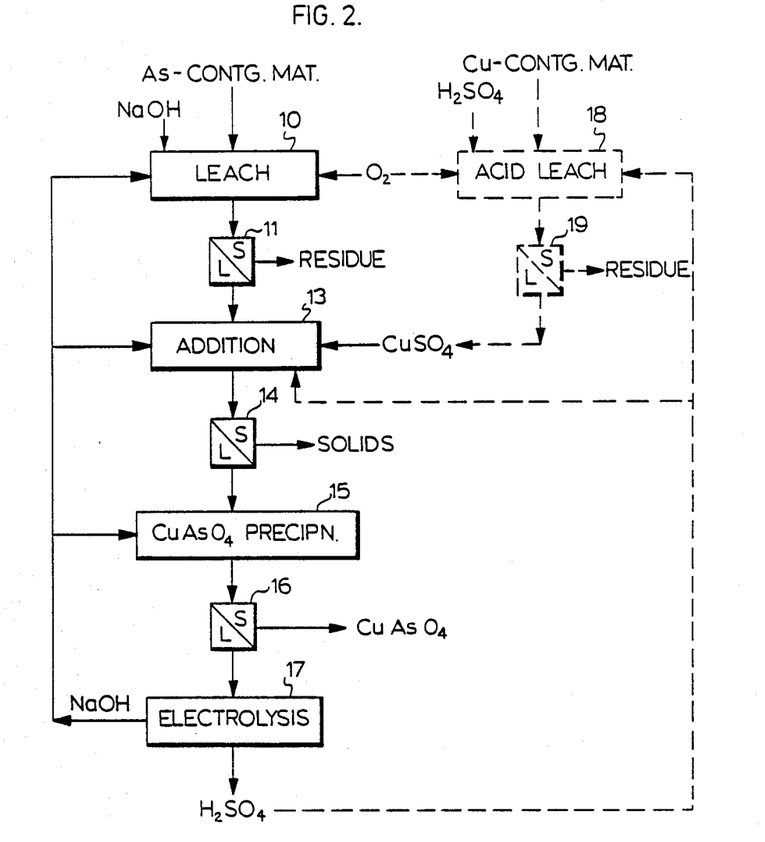
FIG. 2 is a schematic flowsheet of a second embodiment of the preparation of copper arsenate including an electrolysis of sodium sulfate solution.

With reference to FIG. 2, arsenic-containing material is fed to leach 10 and the leach product is subjected to liquid-solids separation 11, as described with reference to FIG. 1. The liquid fraction from separation 11, i.e. a sodium arsenate solution, is fed directly to addition 13, which is carried out with the sodium arsenate solution and with copper sulfate solution as described with reference to FIG. 1. Optionally, as described in reference to FIG. 1, the copper sulfate solution for addition 13 is obtained from an acid oxidative pressure leach 18 followed by a liquid-solids separation 19, as indicated with broken lines.

As stated, addition 13 is carried out as described with reference to FIG. 1 for the formation of a copper and arsenic-containing solution and precipitated impurities, which are subsequently separated in liquid-solids separation 14, followed by copper arsenate precipitation 15 and liquid solids-separation 16, as described. The copper arsenate is recovered as product, substantially free of sludge-forming impurities, and the sodium sulfate solution is treated for the recovery of sodium hydroxide and sulfuric acid in electrolysis 17.

Electrolysis 17 is carried out in a unit, containing an arrangement of electrodes and membranes, similar to the electrolysis 12 described with reference to FIG. 1. At least a portion of the sodium sulfate is converted into acid and hydroxide. The sodium sulfate is converted into sodium hydroxide and sulfuric acid according to the overall equation:

$$Na_2SO_4 + 2H_2O \rightarrow 2NaOH + H_2SO_4$$

Electrolysis 17 may be carried out in any one of the electrolysis units and according to the operations, as described, with the formation of sodium hydroxide solution in the hydroxide compartments and with the formation of sulfuric acid-containing solution in the acid compartments. A portion of the circulating sodium hydroxide solution is withdrawn for return to one or more previous steps, to supply at least a portion of the requirement for sodium hydroxide, such as in leach 10, addition 13 and copper arsenate precipitation 15. A portion of the circulating sulfuric acid-containing solution is withdrawn and may be fed to the optional acid leach 18 for satisfying at least a portion of its sulfuric acid requirement, the rest being supplied, as necessary, as make-up acid. A small quantity of the sulfuric acid-containing solution may also be used, if necessary, in addition 13 for control of the pH. If acid is not used for the preparation of copper sulfate solution, the sulfuric acid-containing solution generated in electrolysis 17 is a by-product of the process.

Figure 3:
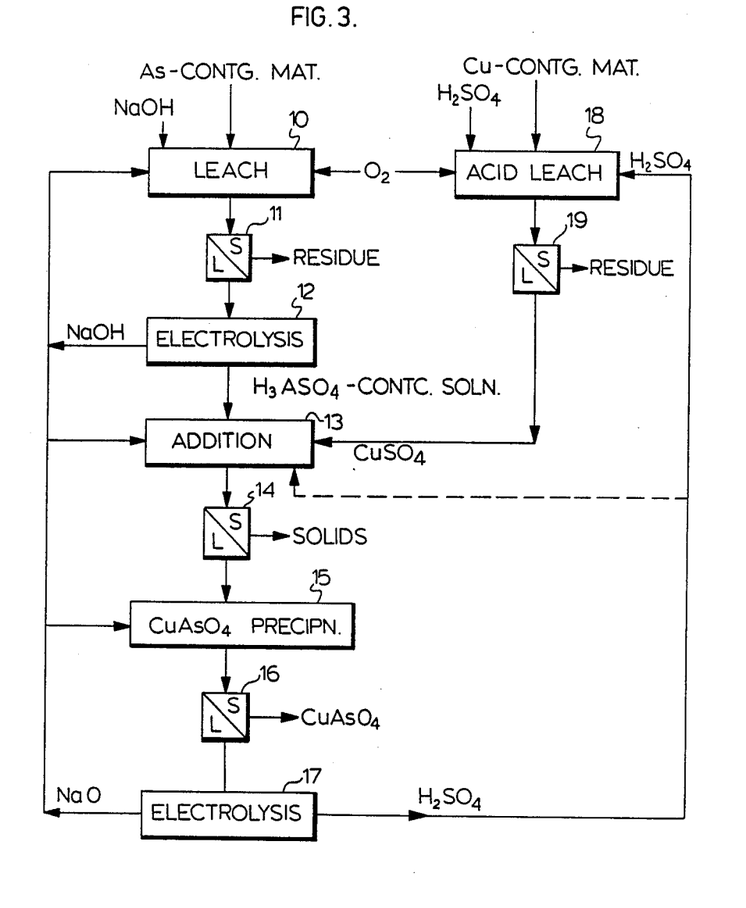
FIG. 3 is a schematic flowsheet of a third embodiment of the preparation of copper arsenate including the electrolysis steps of the first and the second embodiment.

With reference to FIG. 3, the third embodiment of the process is a combination of the first and second embodiments described with reference to FIGS. 1 and 2, respectively. The leach 10 of arsenic-containing material, liquid-solids separation 11, electrolysis 12, addition 13, liquid-solids separation 14, copper arsenate precipitation 15 and liquid-solids separation 16 are all carried out as described with reference to FIG. 1. The copper sulfate solution used in addition 13 is obtained from acid leach 18, followed by liquid-solids separation 19 as described as optional with reference to FIG. 1 or FIG. 2. The electrolysis 17 is carried out as described with reference to FIG. 2.

The advantages of the process according to the third embodiment over that of the first embodiment are the additional recovery of an amount of sodium hydroxide that can be used in the process, and the recovery of sulfuric acid-containing solution that can be used in the acid leach 18. It is noted that as a major portion of the sodium in the process is removed in electrolysis 12, the quantity of sodium sulfate treated in electrolysis 17 according to the third embodiment (FIG. 3) is less than that treated in the electrolysis 17 according to the second embodiment (FIG. 2).

The degrees of conversion that can be attained depends to some extent on the configuration of the electrolysis unit. Using a 3-compartment cell unit, the separation into acid and base of the arsenate or sulfate solution can be substantially complete, with the acid containing less than 1 g/L sodium. A 2-compartment cell unit provides a less complete separation, as arsenate or sulfate solution is added to the recirculating acid-containing solution from which acid-containing solution is withdrawn as product. The choice of configuration and the desired degree of conversion depend on the requirements of the embodiment of the process being used, and on the extent to which sodium is allowed in the process to obtain a product that meets specifications and environmental considerations. It is noted that an electrolysis unit containing bipolar electrodes operates at a low current, at a higher potential at the current rectifier and with a higher separation efficiency than a unit containing only monopolar electrodes.

The performance of the electrolysis steps, when carried out in a 3-compartment cell, is improved by maintaining high concentrations of the circulating diluate. This may be achieved by supplementary concentration methods such as electrodialysis or evaporation/crystallization.

The invention will now be illustrated by means of the the following non-limitative examples.

EXAMPLE 1

A crude sodium arsenate solution was generated by oxidative pressure leaching of arsenic-containing flue dust with sodium hydroxide at 150° C. under 2 MPa oxygen pressure for one hour. The arsenate solution was recovered and allowed to cool to 27° C., resulting in some crystallization of sodium arsenate. The decanted solution contained 17 g/L of excess NaOH, 47 g/L As, 53 g/L Na, 0.49 g/L Pb, and formed the arsenate feed to electrolysis.

An electrolyis unit was used comprising three 3-compartment cells as described, terminal electrodes and bipolar electrodes of silver-lead alloy, Selemion TM CMR cationic and Selemion TM AMV anionic membranes. An 8L portion of the arsenate feed was circulated through the diluate compartments at 0.5 cm/s, and the acid and alkali circulating solutions initially contained 0.25N $H_3AsO_4$ and 0.25N NaOH, respectively. The unit was operated at 225 A/m$^2$ for 68 hours. An arsenic solution containing 99 g/L $H_3AsO_4$ and 0.1 g/L Na and an alkali product containing 110 g/L sodium hydroxide and 0.1 g/L As were produced. The lead content of the products was 0.005 g/L in the acid and 0.003 g/L in the alkali product. The overall current efficiencies for treating the arsenate feed whereby the sodium concentration was reduced from 53 g/L to 5 g/L, were 60.5% cathodic and 62% anodic. The lead cathodic surfaces were corroded by the recirculating alkali solution.

The arsenic acid-containing solution was mixed with a copper sulfate solution containing 40 g/L Cu in an arsenic to copper ratio of unity and at a pH maintained at 1.8 for the production of copper and arsenic-containing solution. After removal of precipitated impurities by filtration, the filtrate was neutralized to pH 3.5 by addition of sodium hydroxide. Precipitated copper arsenate was filtered off, washed and recovered. The copper arsenate product was found to contain 8.5% water, and less than 0.1% by weight of total iron and lead. The results show that a substantially pure copper arsenate can be prepared with a low water content when a major portion of the sodium content in the arsenate feed solution has been removed by electrolysis with membranes.

EXAMPLE 2

An arsenate feed solution was generated in an oxidative pressure leach similar to the one in Example 1. The solution contained 54 g/L As, 57 g/L Na and 0.17 g/L Pb.

A four-cell, 3-compartment monopolar electrode electrolysis unit with Pb-Ag alloy as anodes and 316 stainless steel as cathodes was assembled. Selemion TM CMF cationic and Selemion TM AAV anionic membranes were employed. A 20L portion of the arsenate feed solution was circulated through the diluate compartments, and 0.25 normal solutions of NaOH and $H_3AsO_4$ as starting solutions were circulated through the alkali and acid compartments, respectively.

The unit was operated at 500A/m$^2$ for 65 hours. An acid product containing 115 g/L $H_3AsO_4$, 0.2 g/L Na and 0.005 g/L Pb, and an alkali product containing 215 g/L NaOH, 0.1 g/L As and less than 0.001 g/L Pb were produced. The arsenic acid product was used for the production of copper arsenate as in Example 1. The recovered copper arsenate contained 7.8% water. The results show that an arsenic acid-containing solution substantially free (less than 1 g/L Na) of sodium can be produced.

EXAMPLE 3

A flue dust containing 26.8% As, 50.5% Sb and 0.7% Pb was subjected to an oxidative pressure leach as a slurry with an excess of sodium hydroxide solution, at a temperature maintained at 150° C., under an oxygen pressure of 2 MPa and with agitation. After one hour, the reaction mixture was discharged from the autoclave and filtered. The resulting sodium arsenate solution analyzed 78.0 g/L As, 0.09 g/L Sb, 1.92 g/L Pb and 45.0 g/L NaOH.

A copper matte containing 40.0% Cu, 40.0% Pb, 16.6% S and small amounts of As, Sb, Fe and Ni was slurried in finely divided form with sulfuric acid. The slurry was subjected to an oxidative pressure leach at 150° C. for 90 minutes under an oxygen pressure of 2 MPA. The reaction slurry was discharged and filtered to yield a copper sulfate solution containing 222 g/L Cu, 0.039 g/L Pb, 0.77 g/L Fe, 0.51 g/L Sb, 4.2 g/L As and 31 g/L acid.

Sodium arsenate solution and copper sulfate solution from pressure leaches were mixed in an addition in proportions to give a copper to arsenic ratio of unity in the solution. The addition was carried out at 80° C. while maintaining the pH at a value of 2 by adding sodium hydroxide solution. The precipitated impurities were removed, and the copper and arsenic-containing solution was neutralized to a pH of 3.5 by the addition of solution containing 40 g/L sodium hydroxide. The precipitated copper arsenate was filtered off, washed and recovered as product. The product was analyzed and found to contain 23% moisture and 0.03% Pb, 0.01% Fe and 0.12% Sb.

Filtrate from the copper arsenate precipitation containing 127 g/L $Na_2SO_4$, 3.9 g/L Cu, 0.82 g/L Ni, and 1.6 g/L As was fed at 15 L/h.m$^2$ to a three-cell, 3-compartment electrolysis unit employing bipolar electrodes. The unit employed Selemion TM CMR cationic membranes and Selemion TM AMV anionic membranes. Both the terminal and intermediate electrodes were of Pb-Ag alloys.

The unit was operated at 1000 A/m$^2$ and 40° C. for 52 hours. An alkali product containing 182 g/L NaOH, 0.3 g/L $SO_4$, 0.002 g/L Cu, 0.006 g/L Ni and 0.016 g/L As, and an acid product containing 345 g/L $H_2SO_4$, 0.5 g/L Na, 1.5 g/L As, 0.003 g/L Cu, and 0.002 g/L Ni were produced. The results show that substantially pure copper arsenate can be made from copper-containing and arsenic-containing metallurgical materials, and that sulfuric acid and sodium hydroxide can be effectively recovered by treating the residual process solution by electrolysis with membranes, and can be recycled to the pressure leaching steps of metallurgical starting materials.

EXAMPLE 4

A single three-compartment cell electrolysis unit was assembled using Selemion TM CMF cationic membranes and Selemion TM AMT anionic membranes. The anode was Pt-coated Ti and the cathode was 316 stainless steel. A sodium sulfate solution containing 250 g/L $Na_2SO_4$ at 60° C. was circulated through the middle diluate compartment of the cell. The unit was operated at 3,000 A/m$^2$, while maintaining the temperature at 60° C. by cooling. Water was added to anolyte and catholyte as necessary to control the acid and alkali product concentrations. The cell voltage over the first 48 hour test period was measured at 4.8 to 5.4 volts, and 5.6 to 5.8 volts during a second 48 hours. The results are shown in Table I.

TABLE I

| Time | Acid Product | | Alkali Product | | Current Efficiency | |
|---|---|---|---|---|---|---|
| h | g/L H$_2$SO$_4$ | g/L Na | g/L NaOH | g/L SO$_4$= | Anode | Cathode |
| 24 | 187 | 0.026 | 145 | 0.16 | 44% | 62% |
| 48 | 100 | 0.018 | 157 | 0.08 | 79% | 81% |
| 72 | 100 | 0.017 | 161 | 0.02 | 76% | 89% |
| 96 | 100 | 0.017 | 287 | 0.02 | 79% | 84% |

The results show that substantially pure sulfuric acid and sodium hydroxide solutions can be made from the final process solution at high current density.

EXAMPLE 5

This example illustrates that performance of the electrolysis process using three compartment cells is improved when a high concentration of the circulating diluate is maintained. This is achieved by employing electrodialysis (ED) hereinafter as a concentration method.

Thus, an arsenate feed solution initially containing 54 g/L As and 62 g/L Na (and excess 22 g/L NaOH) was fed at 1350 mL/h to the diluate of a first ED unit, which also received a diluate stream from a first electrolysis unit. The diluate from the first electrolysis unit contained 38 g/L As and 36 g/L Na and was fed to the first ED unit at 700 mL/h. The first Ed unit had an appropriate alternating arrangement of Selemion TM CMV cationic membranes and Selemion TM AMV anionic membranes, with an effective membrane pair area of 5350 cm$^2$. The first ED unit was operated at 340 A/m$^2$ and at 50° C. The diluate from the first ED unit containing 20 g/L As and 10 g/L Na was removed from the process at 1050 mL/min.

A concentrate from the first ED, containing 81 g/L As and 77 g/L Na was fed at 1000 mL/h to the first electrolysis unit. The first electrolysis unit was a 3-compartment bipolar unit employing 620 cm$^2$ of effective area of Selemion TM CMF cationic and AMT anionic membranes. The first electrolysis unit was operated at 2250A/m$^2$ and 50° C. to generate a sodium hydroxide-containing product at 154 g/h NaOH and arsenic acid-containing product at 143 g/h arsenic acid.

The arsenic acid-containing product was mixed with a copper sulfate solution for the precipitation of copper arsenate. A copper arsenate product was obtained as a filter cake with a moisture content of 6.4%. A filtrate from the copper arsenate precipitation containing sodium sulfate was treated as follows.

The sodium sulfate filtrate containing 36 g/L Na$_2$SO$_4$ was fed at 6790 mL/h to the diluate of a second ED unit, which also received a diluate stream containing 99 g/L Na$_2$SO$_4$ at 350 mL/h from a second electrolysis unit. The second ED unit had an appropriate alternating arrangement of Selemion TM CMV cationic and AMV anionic membranes, with an effective membrane pair area of 3200 cm$^2$. The second ED unit was operated at 300 A/m$^2$, and produced a 6440 mL/h diluate containing 9.8 g/L Na$_2$SO$_4$ which was removed from the process.

A concentrate from the second ED unit, containing 250 g/L Na$_2$SO$_4$, was fed at 700 mL/h to the diluate compartment of the second electrolysis unit. The second electrolysis unit was a 3-compartment bipolar unit employing 330 cm$^2$ of effective area of Selemion TM CMF cationic and AMT anionic membranes. The second electrolysis unit was operated at 3000 A/m$^2$ and 50° C. to generate two product streams at 102 g/h NaOH and at 113 g/h H$_2$SO$_4$, respectively.

The alkali products from the two electrolysis units and the sulfuric acid product from the second electrolysis unit can be recycled to supply a portion of the raw materials required for the copper arsenate production.

It is understood that variations and modifications may be made in the embodiments of the invention without departing from the scope and purview of the appended claims.

I claim:

1. A process for the manufacture of copper arsenate with a reduced water content comprising the steps of:
    (a) subjecting an arsenic- and impurity-containing material capable of yielding an arsenate solution to an oxidative pressure leach with sodium hydroxide with the formation of a sodium arsenate solution containing dissolved impurities and a leach residue;
    (b) separating said sodium arsenate solution from said leach residue;
    (c) subjecting said sodium arsenate solution to electrolysis with membranes for the removal of at least a portion of sodium constituent and for that at least partial conversion into an arsenic acid-containing solution and a sodium hydroxide solution;
    (d) mixing said arsenic acid-containing solution with a solution of copper sulfate containing impurities for the formation of a copper and arsenic-containing solution, the precipitation of impurities, and without the precipitation of copper arsenate;
    (e) separating said copper and arsenic-containing solution from precipitated impurities;
    (f) precipitating copper arsenate in the separated copper and arsenic-containing solution by the addition of sodium hydroxide solution with the formation of sodium sulfate solution; and
    (g) separating precipitated copper arsenate from said sodium sulfate solution for the recovery of copper arsenate, said removal of sodium constituent resulting in a reduced water content of the recovered copper arsenate.

2. A process as claimed in claim 1, wherein, additionally, separated sodium sulfate solution is subjected to electrolysis with membranes for the at least partial conversion into a sodium hydroxide solution and a sulfuric acid solution, and recovering said sodium hydroxide solution and said sulfuric acid solution.

3. A process as claimed in claim 1, wherein said copper sulfate solution is obtained by subjecting a copper-containing compound capable of yielding copper sulfate to an aqueous oxidative pressure leach with sulfuric acid for the formation of copper sulfate solution and a leach residue, separating copper sulfate solution from said leach residue, and passing separated copper sulfate solution to said mixing step.

4. A process as claimed in claim 2, where said copper sulfate solution is obtained by subjecting a copper-containing compound capable of yielding copper sulfate to an aqueous oxidative pressure leach with sulfuric acid for the formation of copper sulfate solution and a leach residue, separating copper sulfate solution from said leach residue, and passing separated copper sulfate solution to said mixing step.

5. A process as claimed in claim 1, wherein at least a portion of the sodium hydroxide required in said process is sodium hydroxide solution formed in said electrolysis of sodium arsenate.

6. A process as claimed in claim 2 wherein at least a portion of the sodium hydroxide required in said process is sodium hydroxide solution formed in said electrolysis of sodium arsenate.

7. A process as claimed in claim 3, wherein at least a portion of the sodium hydroxide required in said process is sodium hydroxide solution formed in said electrolysis of sodium arsenate.

8. A process as claimed in claim 2, wherein at least a portion of the sodium hydroxide required in said process is sodium hydroxide solution formed in said electrolysis of sodium sulfate.

9. A process as claimed in claim 4, wherein at least a portion of the sulfuric acid required in said process is sulfuric acid formed in said electrolysis of sodium sulfate.

10. A process as claimed in claim 1, wherein said electrolysis with membranes is carried out in an electrolysis unit containing an arrangement of closely-spaced membranes and electrodes capable of said at least partial conversion, at a current applied between electrodes equivalent to a current density in the range of about 10 to 4,500 A/m$^2$, at a temperature in the range of from just above the freezing temperature of solution to about 60° C., and at a flow solution substantially balanced.

11. A process as claimed in claim 1, wherein said electrolysis with membranes is carried out in an electrolysis unit containing an arrangement of closely-spaced suitable membranes and electrodes capable of said at least partial conversion, at a current applied between electrodes equivalent to a current density in the range of about 200 to 4,000 A/m$^2$, at a temperature in the range of from about ambient to about 50° C and at a flow of solution substantially balanced.

12. A process is claimed in claim 1, wherein said electrolysis of sodium arsenate solution is carried out at a current equivalent to a current density in the range of about 200 to 4,000 A/m$^2$ and said sodium arsenate solution is substantially completely converted into arsenic acid-containing solution and sodium hydroxide.

13. A process is claimed in claim 3, wherein said electrolysis of sodium arsenate solution is carried out at a current equivalent to a current density in the range of about 200 to 4,000 A/m$^2$ and said sodium arsenate solution is substantially completely converted into arsenic acid-containing solution and sodium hydroxide.

14. A process as claimed in claim 1, wherein said electrolysis of sodium arsenate solution is carried out at a current equivalent to a current density in the range of about 200 to 4,000 A/m$^2$ and said sodium arsenate solution is partly converted into an arsenic acid-containing solution containing arsenic acid in the range of about 70 to 250 g/L.

15. A process as claimed in claim 3, wherein said electrolysis of sodium arsenate solution is carried out at a at a current equivalent to a current density in the ranges of about 200 to 4,000 A/m$^2$ and said sodium arsenate solution is partly converted into an arsenic acid-containing solution containing arsenic acid in the range of about 70 to 250 g/L.

16. A process as claimed in claim 4, wherein said electrolysis of sodium sulfate is carried out at a current equivalent to a current density in the range of about 200 to 4,000 A/m$^2$ and said sodium sulfate solution is substantially completely converted into sodium hydroxide and sulfuric acid.

17. A process as claimed in claim 2, wherein said electrolysis of sodium sulfate solution and said electrolysis of sodium arsenate solution are carried out at a current equivalent to a current density in the range of about 200 to 4,000 A/m$^2$ and said sodium sulfate solution and said sodium arsenate solution are converted into sodium hydroxide solution containing sodium hydroxide in the range of about 40 to 200 g/L.

18. A process as claimed in claim 7, wherein said electrolysis of sodium sulfate solution and said electrolysis of sodium arsenate solution are carried out at a current equivalent to a current density in the range of about 200 to 4,000 A/m$^2$ and said sodium sulfate solution and said sodium arsenate solution are converted into sodium hydroxide solution containing sodium hydroxide in the range of about 40 to 200 g/L.

19. A process as claimed in claim 1, wherein arsenic acid-containing solution mixed with copper sulfate solution contains less than about one gram sodium equivalent per litre of said copper and arsenic-containing solution.

20. A process as claimed in claim 2, wherein arsenic acid-containing solution mixed with copper sulfate solution contains less than about one gram sodium equivalent per litre of said copper and arsenic-containing solution.

21. A process as claimed in claim 3, wherein arsenic acid-containing solution mixed with copper sulfate solution contains less than about one gram sodium equivalent per litre of said copper and arsenic-containing solution.

* * * * *

UNITED STATES PATENT AND TRADEMARK OFFICE
CERTIFICATE OF CORRECTION

PATENT NO. : 4,961,909

DATED : October 9, 1990

INVENTOR(S) : Daniel A. Boateng

It is certified that error appears in the above-identified patent and that said Letters Patent is hereby corrected as shown below:

On the title page:

Item [73] "Comino" should be --Cominco--.

Col. 16, claim 18, line 27, "claim 7" should be --claim 4 --.

Signed and Sealed this

Twelfth Day of March, 1991

*Attest:*

HARRY F. MANBECK, JR.

*Attesting Officer*     *Commissioner of Patents and Trademarks*